United States Patent
Kota et al.

(10) Patent No.: US 7,577,727 B2
(45) Date of Patent: Aug. 18, 2009

(54) DYNAMIC MULTIPLE CLUSTER SYSTEM RECONFIGURATION

(75) Inventors: Rajesh Kota, Austin, TX (US); Shashank Newawarker, Austin, TX (US); Guru Prasadh, Austin, TX (US); Carl Zeitler, Tomball, TX (US); David B. Glasco, Austin, TX (US)

(73) Assignee: Newisys, Inc., San Jose, CA (US)

( * ) Notice: Subject to any disclaimer, the term of this patent is extended or adjusted under 35 U.S.C. 154(b) by 882 days.

(21) Appl. No.: 10/607,819

(22) Filed: Jun. 27, 2003

(65) Prior Publication Data

US 2005/0021699 A1 Jan. 27, 2005

(51) Int. Cl.
 *G06F 15/177* (2006.01)
(52) U.S. Cl. .............. 709/221; 709/203; 709/220; 709/222; 709/227; 712/15
(58) Field of Classification Search ......... 709/203, 709/220–222, 227; 712/15, 1, 10
See application file for complete search history.

(56) References Cited

U.S. PATENT DOCUMENTS

| | | | |
|---|---|---|---|
| 4,470,114 A | 9/1984 | Gerhold | |
| 4,636,942 A | 1/1987 | Chen et al. | |
| 4,667,287 A | 5/1987 | Allen et al. | |
| 4,754,398 A | 6/1988 | Pribnow | |
| 4,783,687 A | 11/1988 | Rees | |
| 5,125,081 A | 6/1992 | Chiba | |
| 5,166,674 A | 11/1992 | Baum et al. | |
| 5,191,651 A | 3/1993 | Halim et al. | |
| 5,197,130 A | 3/1993 | Chen et al. | |
| 5,301,311 A | 4/1994 | Fushimi et al. | |
| 5,371,852 A | 12/1994 | Attanasio et al. | |
| 5,561,768 A | 10/1996 | Smith | 395/200.1 |
| 5,623,644 A * | 4/1997 | Self et al. | 713/503 |

(Continued)

FOREIGN PATENT DOCUMENTS

EP 0505792 9/1992

(Continued)

OTHER PUBLICATIONS

M. Sgroi, M. Sheets, A. Mihal, K. Keutzer, S. Malik, J. Rabaey, A. Sangiovanni-Vencentelli, "Addressing the system-on-a-chip interconnect woes through communication-based design", Annual ACM IEEE Design Automation Conference, Proceedings of the 38th conference on Design automation, pp. 667-672, 2001. [retrieved from ACM Mar. 28, 2008].*

(Continued)

*Primary Examiner*—Ario Etienne
*Assistant Examiner*—Lashanya R Nash
(74) *Attorney, Agent, or Firm*—Weaver Austin Villeneuve & Sampson LLP

(57) ABSTRACT

According to the present invention, methods and apparatus are provided to allow dynamic multiple cluster system configuration changes. In one example, processors in the multiple cluster system share a virtual address space. Mechanisms for dynamically introducing and removing processors, I/O resources, and clusters are provided. The mechanisms can be implemented during reset or while a system is operating. Links can be dynamically enabled or disabled.

12 Claims, 10 Drawing Sheets

U.S. PATENT DOCUMENTS

| | | | |
|---|---|---|---|
| 5,682,512 A | 10/1997 | Tetrick | |
| 5,692,123 A | 11/1997 | Logghe | |
| 5,734,830 A * | 3/1998 | Balogh et al. | 709/208 |
| 5,781,187 A | 7/1998 | Gephardt et al. | |
| 5,781,726 A * | 7/1998 | Pereira | 709/200 |
| 5,796,605 A | 8/1998 | Hagersten | |
| 5,805,839 A | 9/1998 | Singhal | |
| 5,819,075 A | 10/1998 | Forsmo | |
| 5,822,531 A | 10/1998 | Gorczyca et al. | |
| 5,931,938 A | 8/1999 | Drogichen et al. | |
| 6,003,075 A | 12/1999 | Arendt et al. | |
| 6,014,669 A | 1/2000 | Slaughter et al. | |
| 6,038,651 A | 3/2000 | VanHuben et al. | |
| 6,047,332 A | 4/2000 | Viswanathan et al. | |
| 6,065,073 A * | 5/2000 | Booth | 710/46 |
| 6,085,295 A | 7/2000 | Ekanadham et al. | |
| 6,097,707 A | 8/2000 | Hodzic et al. | |
| 6,151,663 A | 11/2000 | Pawlowski et al. | |
| 6,167,492 A | 12/2000 | Keller et al. | 711/154 |
| 6,209,065 B1 | 3/2001 | Van Doren et al. | |
| 6,219,775 B1 | 4/2001 | Wade et al. | 712/11 |
| 6,226,671 B1 | 5/2001 | Hagersten et al. | |
| 6,256,671 B1 | 7/2001 | Strentzsch et al. | |
| 6,259,701 B1 | 7/2001 | Shur et al. | |
| 6,331,983 B1 | 12/2001 | Haggerty et al. | |
| 6,338,122 B1 | 1/2002 | Baumgartner et al. | |
| 6,349,091 B1 | 2/2002 | Li | |
| 6,370,585 B1 | 4/2002 | Hagersten et al. | |
| 6,377,640 B2 | 4/2002 | Trans | |
| 6,385,174 B1 | 5/2002 | Li | |
| 6,385,705 B1 | 5/2002 | Keller et al. | 711/154 |
| 6,397,255 B1 | 5/2002 | Nurenberg et al. | |
| 6,463,529 B1 | 10/2002 | Miller et al. | |
| 6,467,007 B1 | 10/2002 | Armstrong et al. | |
| 6,490,661 B1 | 12/2002 | Keller et al. | 711/150 |
| 6,553,439 B1 | 4/2003 | Greger et al. | |
| 6,578,071 B2 | 6/2003 | Hagersten et al. | |
| 6,598,130 B2 | 7/2003 | Harris et al. | |
| 6,687,751 B1 | 2/2004 | Wils et al. | |
| 6,690,757 B1 | 2/2004 | Bunton et al. | |
| 6,718,552 B1 | 4/2004 | Goode | |
| 6,745,240 B1 | 6/2004 | Denman et al. | |
| 6,760,819 B2 | 7/2004 | Dhong et al. | |
| 6,772,226 B1 | 8/2004 | Bommareddy et al. | |
| 6,785,726 B1 | 8/2004 | Freeman et al. | |
| 6,820,174 B2 | 11/2004 | Venderwiel | |
| 6,826,660 B2 | 11/2004 | Hagersten et al. | |
| 6,847,993 B1 | 1/2005 | Novaes et al. | |
| 6,854,069 B2 | 2/2005 | Kampe et al. | |
| 6,856,621 B1 | 2/2005 | Artes | |
| 6,889,253 B2 * | 5/2005 | Griffin et al. | 709/221 |
| 6,920,519 B1 | 7/2005 | Beukema et al. | |
| 6,925,492 B2 * | 8/2005 | Shirriff | 709/220 |
| 6,952,766 B2 * | 10/2005 | Dervin et al. | 713/2 |
| 6,977,908 B2 | 12/2005 | De Azevedo et al. | |
| 7,010,617 B2 | 3/2006 | Kampe et al. | |
| 7,043,569 B1 | 5/2006 | Chou et al. | |
| 7,107,382 B2 * | 9/2006 | Clayton | 710/305 |
| 7,155,525 B2 | 12/2006 | Glasco et al. | |
| 2001/0014097 A1 | 8/2001 | Beck et al. | |
| 2001/0037435 A1 | 11/2001 | Van Doren | |
| 2002/0004915 A1 | 1/2002 | Fung | |
| 2002/0007463 A1 | 1/2002 | Fung | |
| 2002/0156888 A1 | 10/2002 | Lee et al. | |
| 2002/0157035 A1 | 10/2002 | Wong et al. | |
| 2002/0174168 A1 | 11/2002 | Beukema et al. | |
| 2003/0225909 A1 | 12/2003 | Glasco et al. | |
| 2003/0225938 A1 | 12/2003 | Glasco et al. | |
| 2004/0098475 A1 | 5/2004 | Zeitler et al. | |
| 2004/0153507 A1 | 8/2004 | Zeitler et al. | |
| 2006/0184480 A1 * | 8/2006 | Ayyar et al. | 706/45 |

FOREIGN PATENT DOCUMENTS

| | | |
|---|---|---|
| EP | 0608663 | 8/1994 |
| EP | 0712076 | 5/1996 |
| EP | 0730237 | 9/1996 |
| EP | 0978781 | 2/2000 |
| JP | 08239029 | 12/1996 |
| WO | WO 02/39242 | 5/2002 |

OTHER PUBLICATIONS

Qun Ren, Margaret H. Dunham, "Using clustering for effective management of a semantic cache in mobile computing" International Workshop on Data Engineering for Wireless and Mobile Access archive Proceedings of the 1st ACM international workshop on Data engineering for wireless and mobile access; pp. 94-101, 1999.[retrieved form ACM Mar. 28, 2008].*

Barroso, L.A.; Gharachorloo, K.; McNamara, R.; Nowatzyk, A.; Qadeer, S.; Sano, B.; Smith, S.; Stets, R.; Verghese, B., "Piranha: a scalable architecture based on single-chip multiprocessing";Computer Architecture, 2000. Proceedings of the 27th International Symposium on 2000 pp. 282-293. [retrieved from IEE on Oct. 22, 2008].*

*HyperTransport™ I/O Link Specification Revision 1.03*, HyperTransport™ Consortium, Oct. 10, 2001, Copyright © 2001 HyperTransport Technology Consortium.

PCT Search Report—PCT/US04/19524 dated Nov. 13, 2006.

PCT Written Opinion—PCT/US04/19524 dated Nov. 13, 2006.

D. E. Culler, J. P. Singh, A. Gupta, "Parallel Computer Architecture", 1999 Morgan Kaufmann, San Francisco, CA USA XP002277658.

Andrew Tanenbaum, "Computer Networks", Computer Networks, London: Prentice Hall International, GB, 1996, pp. 345-403, XP002155220.

International Search Report dated Aug. 17, 2004, from PCT Application No. PCT/US2003/034687 (9 pages).

European Search Report, Application No. 03 778 027.7-2211, Mailed Mar. 29, 2006.

US Office Action mailed Sep. 21, 2005 for U.S. Appl. No. 10/157,384.

US Office Action mailed Jan. 30, 2006 for U.S. Appl. No. 10/157,384.

Notice of Allowance and Notice of Allowability mailed Jun. 15, 2006 for U.S. Appl. No. 10/157,384.

Chinese Office Action dated Aug. 15, 2008, Application No. 200480024015.6 (PCT/US2004/019524).

Chinese Office Action mailed Feb. 13, 2009, from Application No. 200480024015.6.

EP Supplemental Search Report dated Sep. 23, 2008, from Application No. 04755610.5.

Su, Stanley Y. W., et al., "Dynamically Partitionable Multicomputers with Switchable Memory," Journal of Parallel and Distributed Computing, Nov. 1, 1984, No. 2, New York, pp. 152-184.

* cited by examiner

L# - Link number
N# - Node number

|  |  | Local Table | | Global Table | | | |
|---|---|---|---|---|---|---|---|
|  |  | Dest Node | | Dest Cluster | | | |
| Source |  | $N_0$ | $N_1$ | $C_0$ | $C_1$ | $C_2$ | $C_3$ |
| Cluster 0 | Node 0 | X | $L_0$ | NA | NA | NA | NA |
|  | Node 1 | $L_0$ | X | X | $L_1$ | $L_2$ | $L_1$ |
| Cluster 1 | Node 0 | X | $L_0$ | NA | NA | NA | NA |
|  | Node 1 | $L_0$ | X | $L_1$ | X | $L_2$ | $L_2$ |
| Cluster 2 | Node 0 | X | $L_0$ | NA | NA | NA | NA |
|  | Node 1 | $L_0$ | X | $L_2$ | $L_2$ | X | $L_1$ |
| Cluster 3 | Node 0 | X | $L_0$ | NA | NA | NA | NA |
|  | Node 1 | $L_0$ | X | $L_2$ | $L_2$ | $L_1$ | X |

DYNAMIC MULTIPLE CLUSTER SYSTEM RECONFIGURATION

CROSS-REFERENCE TO RELATED APPLICATIONS

The present application is related to filed U.S. patent application Ser. No. 10/157,384 titled Transaction Management in Systems Having Multiple Multi-Processor Clusters by David B. Glasco et al. and filed on May 28, 2002, the entirety of which is incorporated by reference herein for all purposes.

BACKGROUND OF THE INVENTION

1. Field of the Invention

The present invention generally relates to a multiple processor system. More specifically, the present invention provides techniques for effectively and efficiently managing resources in a multiple cluster system.

2. Description of Related Art

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions.

A variety of mechanisms can be used to connect the multiple processor clusters. However, mechanisms for dynamically changing the configuration of a multiple cluster system have been limited. A variety of challenges have limited that functionality of communications protocols including physical layer protocols in multiple cluster systems.

Consequently, it is desirable to provide techniques for improving the mechanisms and techniques for communications between clusters in systems having multiple clusters of multiple processors connected using point-to-point links.

SUMMARY OF THE INVENTION

According to the present invention, methods and apparatus are provided to allow dynamic multiple cluster system configuration changes. In one example, processors in the multiple cluster system share a virtual address space. Mechanisms for dynamically introducing and removing processors, I/O resources, and clusters are provided. The mechanisms can be implemented during reset or while a system is operating. Links can be dynamically enabled or disabled.

In one embodiment, a computer system is provided. The computer system includes a first cluster and a second cluster. The first cluster includes a first plurality of processors and a first interconnection controller. The first plurality of processors and the first interconnection controller are in communication using a point-to-point architecture. The second cluster includes a second plurality of processors and a second interconnection controller. The second plurality of processors and the second interconnection controller are in communication using a point-to-point architecture. Polling for a link from the first interconnection controller to the second interconnection controller can be enabled or disabled by configuring the first interconnection controller.

In another example, a method for introducing a cluster of processors is provided. A first interconnection controller in a first cluster including a first plurality of processor in communication using a point-to-point architecture is configured to poll for the presence of a second interconnection controller. A reset signal is asserted on a second interconnection controller in a second cluster including a second plurality of processors in communication using a point-to-point architecture. A link layer protocol is established on a connection between the first and second interconnection controllers.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Figure 1A:
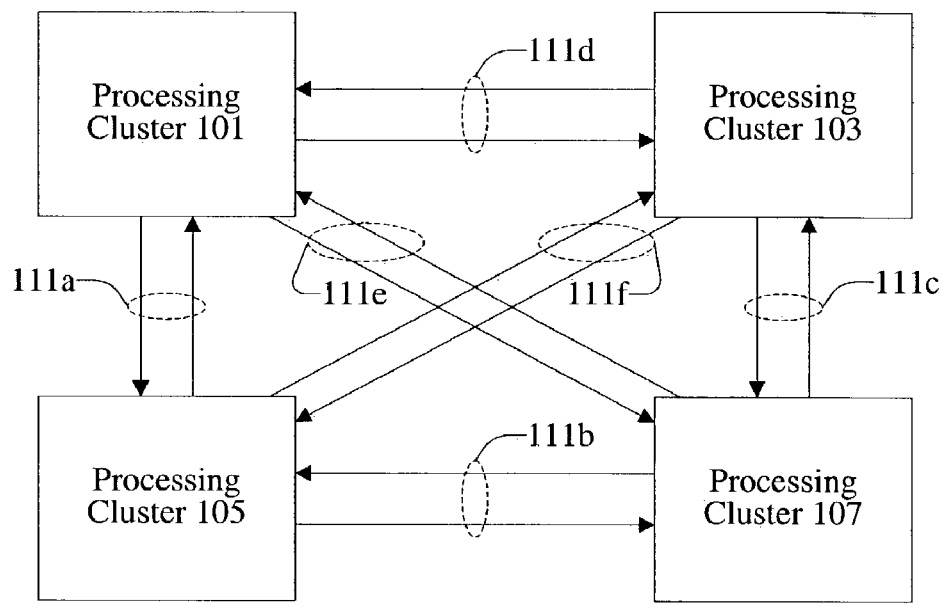
FIGS. 1A and 1B are diagrammatic representations depicting systems having multiple clusters.

FIG. 1A is a diagrammatic representation of one example of a multiple cluster, multiple processor system which may employ the techniques of the present invention. Each processing cluster 101, 103, 105, and 107 includes a plurality of processors. The processing clusters 101, 103, 105, and 107 are connected to each other through point-to-point links 111a-f. The multiple processors in the multiple cluster architecture shown in FIG. 1A share a global memory space. In this example, the point-to-point links 111a-f are internal system connections that are used in place of a traditional front-side bus to connect the multiple processors in the multiple clusters 101, 103, 105, and 107. The point-to-point links may support any point-to-point coherence protocol.

Figure 1B:
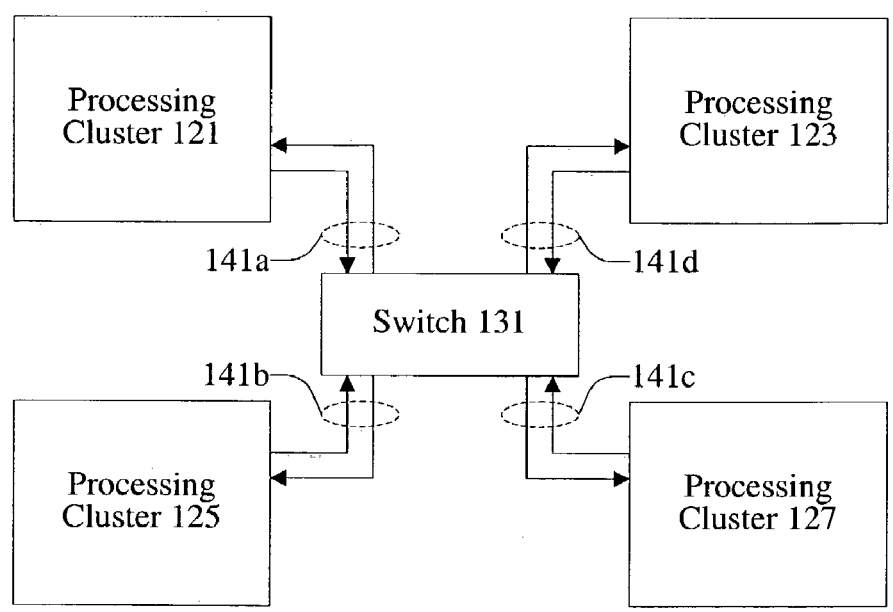

FIG. 1B is a diagrammatic representation of another example of a multiple cluster, multiple processor system that may employ the techniques of the present invention. Each processing cluster 121, 123, 125, and 127 is coupled to a switch 131 through point-to-point links 141a-d. It should be noted that using a switch and point-to-point links allows implementation with fewer point-to-point links when connecting multiple clusters in the system. A switch 131 can include a general purpose processor with a coherence protocol interface. According to various implementations, a multi-cluster system shown in FIG. 1A may be expanded using a switch 131 as shown in FIG. 1B.

Figure 2:
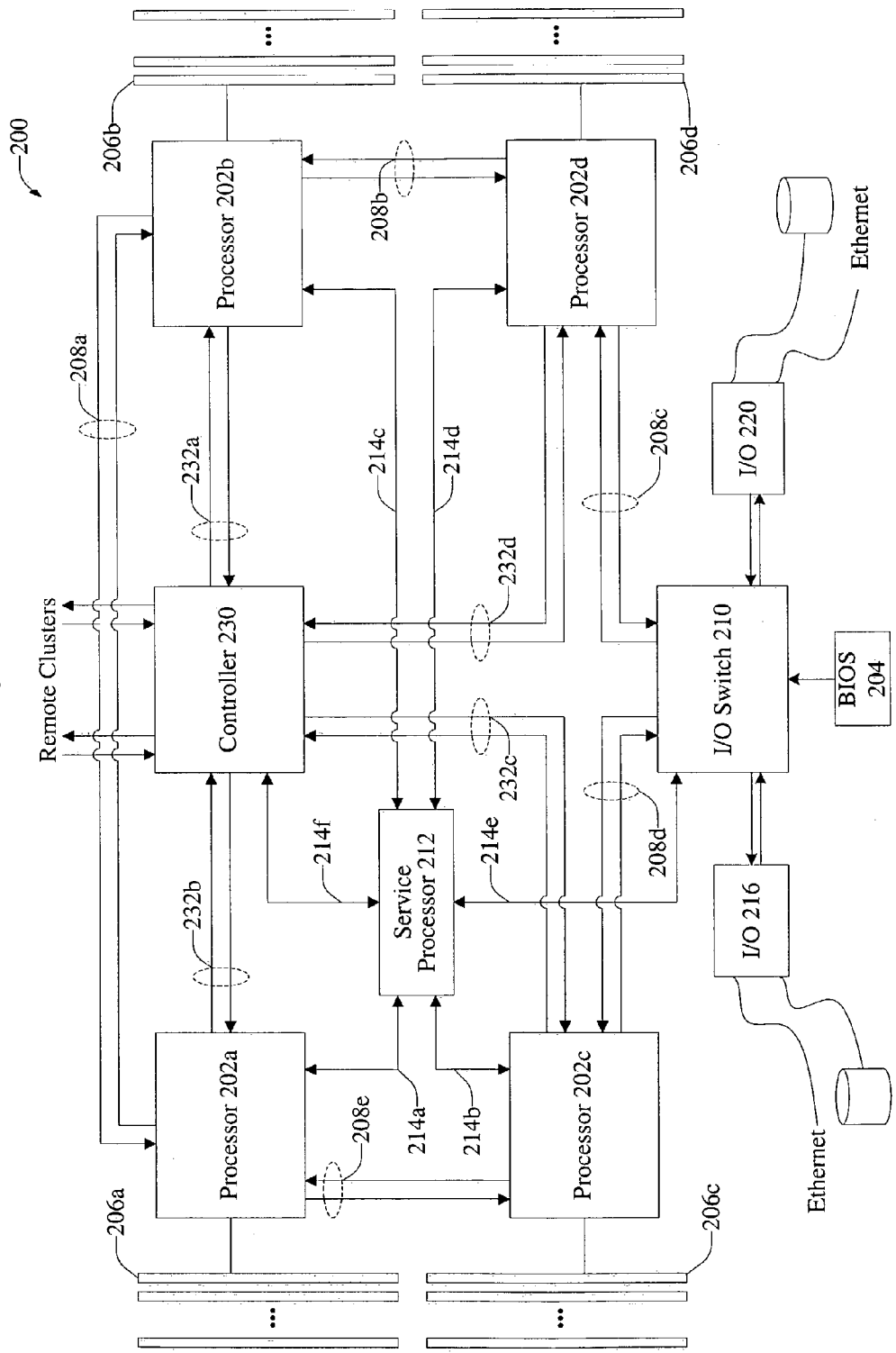
FIG. 2 is a diagrammatic representation of an exemplary cluster having a plurality of processors.

FIG. 2 is a diagrammatic representation of one example of a multiple processor cluster. Cluster 200 includes processors 202a-202d, one or more Basic I/O systems (BIOS) 204, a memory subsystem comprising memory banks 206a-206d, point-to-point communication links 208a-208e, and a service processor 212. The point-to-point communication links are configured to allow interconnections between processors 202a-202d, I/O switch 210, and interconnection controller 230. The service processor 212 is configured to allow communications with processors 202a-202d, I/O switch 210, and interconnection controller 230 via a JTAG interface represented in FIG. 2 by links 214a-214f. In one example, the service processor 212 is also connected to the BIOS 204. It should be noted that other interfaces are supported. I/O switch 210 connects the rest of the system to I/O adapters 216 and 220, and to BIOS 204 for booting purposes.

According to specific embodiments, the service processor of the present invention has the intelligence to partition system resources according to a previously specified partitioning schema. In one implementation, the service processor can explore the connection of clusters with remote links and the presence of processing and I/O elements within each cluster and generate routing table information for BIOS 204. BIOS 204 can then use this information to program the complete system. The partitioning can be achieved through direct manipulation of routing tables associated with the system processors by the service processor which is made possible by the point-to-point communication infrastructure. The routing tables can also be changed by execution of the BIOS code in one or more processors. The routing tables are used to control and isolate various system resources, the connections between which are defined therein.

The processors 202a-d are also coupled to an interconnection controller 230 through point-to-point links 232a-d. According to various embodiments and as will be described below in greater detail, the interconnection controller 230 performs a variety of functions which enable the number of interconnected processors in the system to exceed the node ID space and mapping table limitations associated with each of a plurality of processor clusters. According to some embodiments, the interconnection controller 230 performs a variety of other functions including the maintaining of cache coherency across clusters. Interconnection controller 230 can be coupled to similar controllers associated with other multiprocessor clusters. It should be noted that there can be more than one such interconnection controller in one cluster. Interconnection controller 230 communicates with both processors 202a-d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of cluster 200 will be assumed. For example, most of the resources shown in FIG. 2 are assumed to reside on a single electronic assembly. In addition, memory banks 206a-206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet. BIOS 204 may be any persistent memory like flash memory.

According to one embodiment, service processor 212 is a Motorola MPC855T microprocessor which includes integrated chipset functions, and interconnection controller 230 is an Application Specific Integrated Circuit (ASIC) supporting the local point-to-point coherence protocol. Interconnection controller 230 can also be configured to handle a non-coherent protocol to allow communication with I/O devices. In one embodiment, the interconnection controller 230 is a specially configured programmable chip such as a programmable logic device or a field programmable gate array. In another embodiment, the interconnect controller 230 is an Application Specific Integrated Circuit (ASIC). In yet another embodiment, the interconnect controller 230 is a general purpose processor augmented with an ability to access and process interconnect packet traffic.

Figure 3:
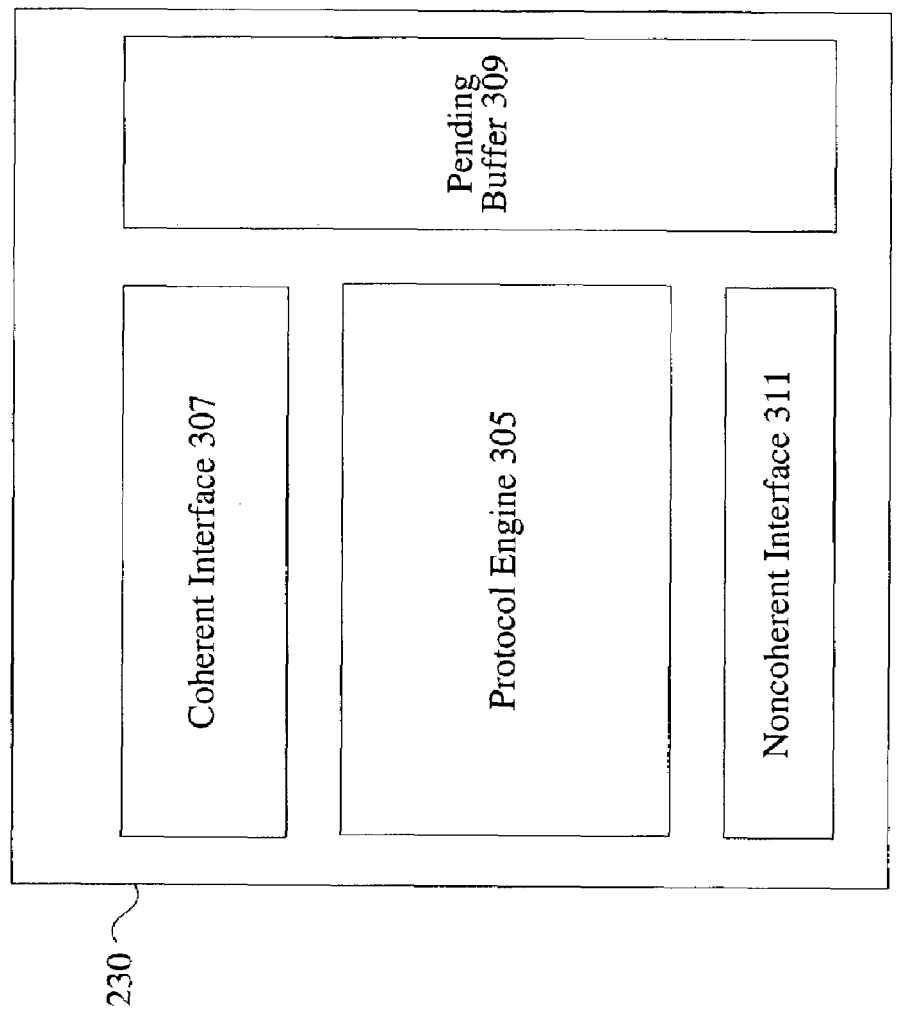
FIG. 3 is a diagrammatic representation of an exemplary interconnection controller for facilitating various embodiments of the present invention.

FIG. 3 is a diagrammatic representation of one example of an interconnection controller 230 for facilitating various aspects of the present invention. According to various embodiments, the interconnection controller includes a protocol engine 305 configured to handle packets such as probes and requests received from processors in various clusters of a multi-processor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the interconnection controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information. A history buffer 311 may also be provided to allow for efficient retransmission of packets that have not been successfully received by an interconnection controller in another cluster.

The interconnection controller has a coherent protocol interface 307 that allows the interconnection controller to communicate with other processors in the cluster as well as external processor clusters. The interconnection controller may also include other interfaces such as a non-coherent protocol interface 311 for communicating with I/O devices (e.g., as represented in FIG. 2 by links 208c and 208d). According to various embodiments, each interface 307 and 311 is implemented either as a full crossbar or as separate receive and transmit units using components such as multiplexers and buffers. It should be noted that the interconnection controller 230 does not necessarily need to provide both coherent and non-coherent interfaces. It should also be noted that an interconnection controller 230 in one cluster can communicate with an interconnection controller 230 in another cluster.

Figure 4:
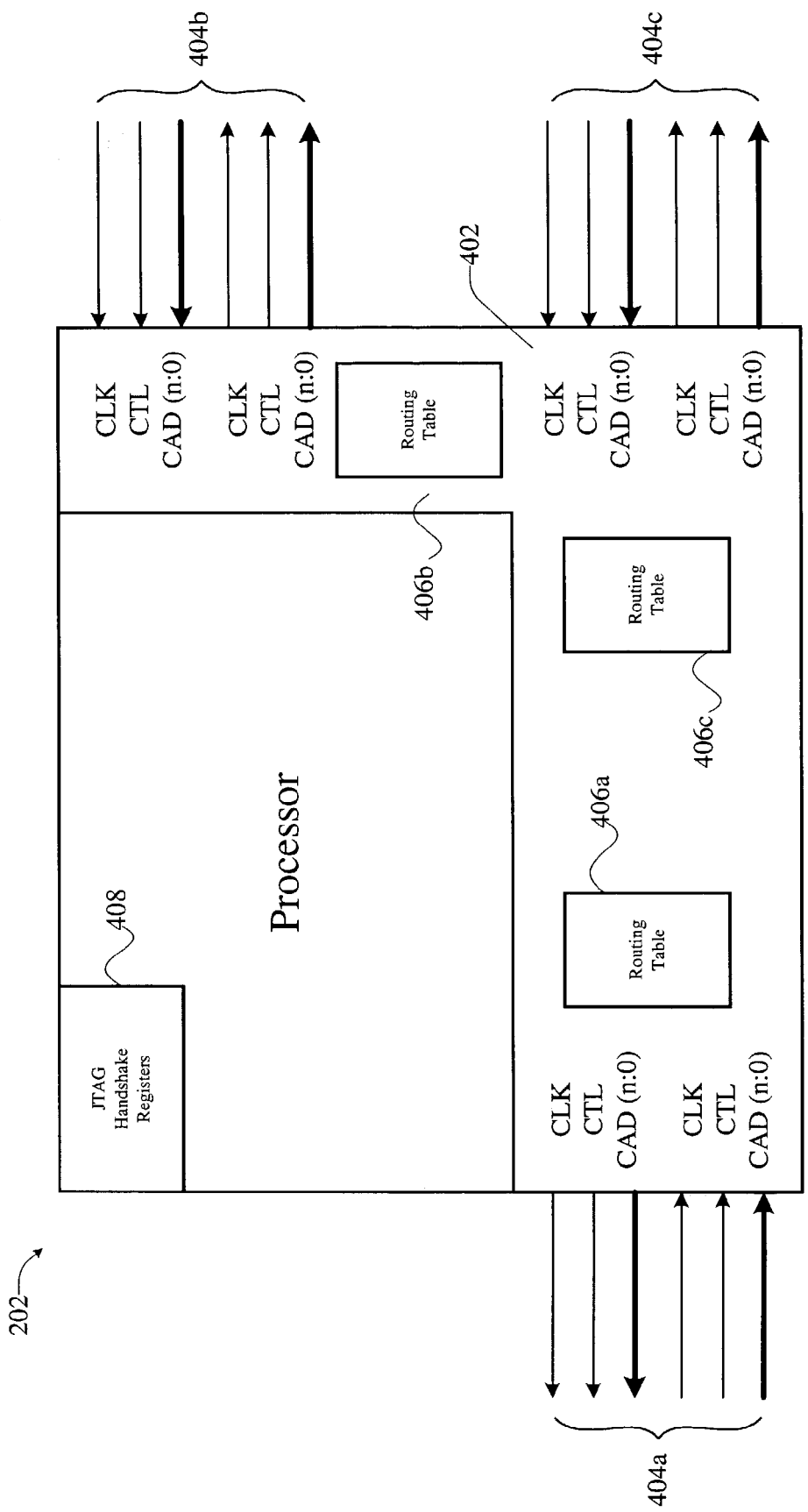
FIG. 4 is a diagrammatic representation of a local processor.

According to various embodiments of the invention, processors 202a-202d are substantially identical. FIG. 4 is a simplified block diagram of such a processor 202 which includes an interface 402 having a plurality of ports 404a-404c and routing tables 406a-406c associated therewith. Each port 404 allows communication with other resources, e.g., processors or I/O devices, in the computer system via associated links, e.g., links 208a-208e of FIG. 2.

The infrastructure shown in FIG. 4 can be generalized as a point-to-point, distributed routing mechanism which comprises a plurality of segments interconnecting the systems processors according to any of a variety of topologies, e.g., ring, mesh, etc. Each of the endpoints of each of the segments is associated with a connected processor which has a unique node ID and a plurality of associated resources which it "owns," e.g., the memory and I/O to which it's connected.

The routing tables associated with each of the nodes in the distributed routing mechanism collectively represent the current state of interconnection among the computer system resources. Each of the resources (e.g., a specific memory range or I/O device) owned by any given node (e.g., processor) is represented in the routing table(s) associated with the node as an address. When a request arrives at a node, the requested address is compared to a two level entry in the node's routing table identifying the appropriate node and link, i.e., given a particular address within a range of addresses, go to node x; and for node x use link y.

As shown in FIG. 4, processor 202 can conduct point-to-point communication with three other processors according to the information in the associated routing tables. According to a specific embodiment, routing tables 406a-406c comprise two-level tables, a first level associating the unique addresses of system resources (e.g., a memory bank) with a corresponding node (e.g., one of the processors), and a second level associating each node with the link (e.g., 208a-208e) to be used to reach the node from the current node.

Processor 202 also has a set of JTAG handshake registers 408 which, among other things, facilitate communication between the service processor (e.g., service processor 212 of FIG. 2) and processor 202. That is, the service processor can write routing table entries to handshake registers 408 for eventual storage in routing tables 406a-406c. It should be understood that the processor architecture depicted in FIG. 4 is merely exemplary for the purpose of describing a specific embodiment of the present invention. For example, a fewer or greater number of ports and/or routing tables may be used to implement other embodiments of the invention.

As mentioned above, the basic protocol upon which the clusters in specific embodiments of the invention are based provides for a limited node ID space which, according to a particular implementation, is a 3-bit space, therefore allowing for the unique identification of only 8 nodes. That is, if this basic protocol is employed without the innovations represented by the present invention, only 8 nodes may be interconnected in a single cluster via the point-to-point infrastructure. To get around this limitation, the present invention introduces a hierarchical mechanism which preserves the single-layer identification scheme within particular clusters while enabling interconnection with and communication between other similarly situated clusters and processing nodes.

According to a specific embodiment, one of the nodes in each multi-processor cluster is an interconnection controller, e.g., the interconnection controller 230 of FIG. 2, which manages the hierarchical mapping of information thereby enabling multiple clusters to share a single memory address space while simultaneously allowing the processors within its cluster to operate and to interact with any processor in any cluster without "knowledge" of anything outside of their own cluster. The interconnection controller appears to its associated processor to be just another one of the processors or nodes in the cluster.

In the basic protocol, when a particular processor in a cluster generates a request, a set of address mapping tables are employed to map the request to one of the other nodes in the cluster. That is, each node in a cluster has a portion of a shared memory space with which it is associated. There are different types of address mapping tables for main memory, memory-mapped I/O, different types of I/O space, etc. These address mapping tables map the address identified in the request to a particular node in the cluster.

A set of routing tables are then employed to determine how to get from the requesting node to the node identified from the address mapping table. That is, as discussed above, each processor (i.e., cluster node) has associated routing tables which identify a particular link in the point-to-point infrastructure which may be used to transmit the request from the current node to the node identified from the address mapping tables. Although generally a node may correspond to one or a plurality of resources (including, for example, a processor), it should be noted that the terms node and processor are often used interchangeably herein. According to a particular implementation, a node comprises multiple sub-units, e.g., CPUs, memory controllers, I/O bridges, etc., each of which has a unit ID.

In addition, because individual transactions may be segmented in non-consecutive packets, each packet includes a unique transaction tag to identify the transaction with which the packet is associated with reference to the node which initiated the transaction. According to a specific implementation, a transaction tag identifies the source node (3-bit field), the source node unit (2-bit field), and a transaction ID (5-bit field).

Thus, when a transaction is initiated at a particular node, the address mapping tables are employed to identify the destination node (and unit) which are then appended to the packet and used by the routing tables to identify the appropriate link(s) on which to route the packet. The source information is used by the destination node and any other nodes which are probed with the request to respond to the request appropriately.

According to a specific embodiment and as mentioned above, the interconnection controller in each cluster appears to the other processors in its cluster as just another processor in the cluster. However, the portion of the shared memory space associated with the interconnection controller actually encompasses the remainder of the globally shared memory space, i.e., the memory associated with all other clusters in the system. That is, from the perspective of the local processors in a particular cluster, the memory space associated with all of the other multi-processor clusters in the system are represented by the interconnection controller(s) in their own cluster.

According to an even more specific embodiment which will be described with reference to FIG. 5, each cluster has five nodes (e.g., as shown in FIG. 2) which include four processors 202a-d and an interconnection controller 230, each of which is represented by a 3-bit node ID which is unique within the cluster. As mentioned above, each processor (i.e., cluster node) may represent a number of sub-units including, for example, CPUs, memory controllers, etc.

Figure 5:
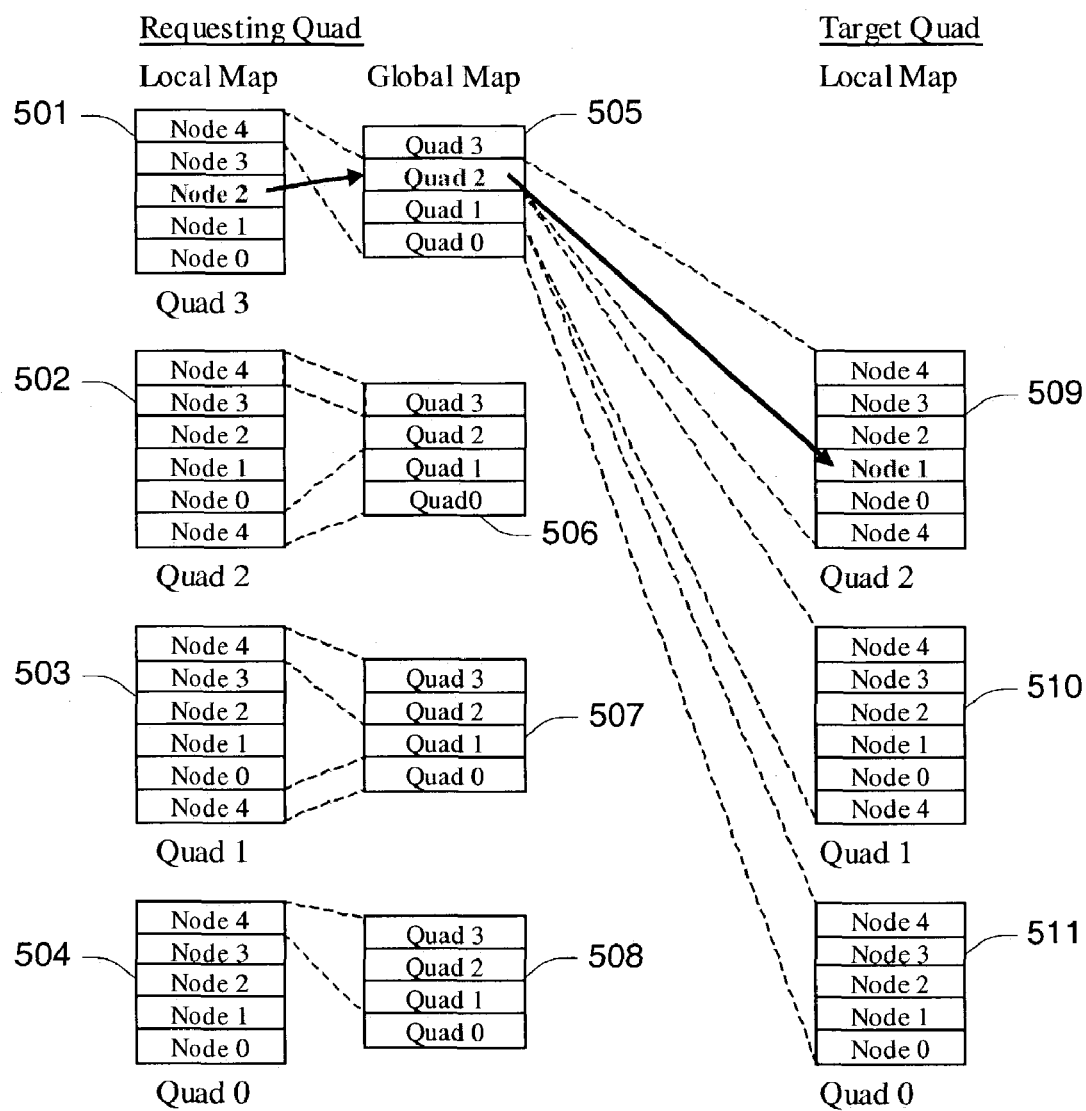
FIG. 5 is a diagrammatic representation of a memory mapping scheme according to a particular embodiment of the invention.

An illustration of an exemplary address mapping scheme designed according to the invention and assuming such a cluster configuration is shown in FIG. 5. In the illustrated example, it is also assumed that the global memory space is shared by 4 such clusters also referred to herein as quads (in that each contains four local processors). As will be understood, the number of clusters and nodes within each cluster may vary according to different embodiments.

To extend the address mapping function beyond a single cluster, each cluster maps its local memory space, i.e., the portion of the global memory space associated with the processors in that cluster, into a contiguous region while the remaining portion of the global memory space above and below this region is mapped to the local interconnection controller(s). The interconnection controller in each cluster maintains two mapping tables: a global map and local map. The global map maps outgoing requests to remote clusters. The local map maps incoming requests from remote clusters to a particular node within the local cluster.

Referring now to FIG. 5, each local cluster has a local memory map (501-504), which maps the local memory space (i.e., the contiguous portion of the global memory space associated with the local processors) into the respective nodes and maps all remote memory spaces (i.e., the remainder of the global memory space) into one or two map entries associated with the local interconnection controller(s), e.g., Node 4 of Quad 3. Each node in the local cluster has a copy of the local map. The interconnection controller in each cluster also maintains a global map (505-508) relating these remote memory spaces with each of the other clusters in the system. Each interconnection controller uses its copy of the local map (509-511) to map requests received from remote clusters to the individual nodes in its cluster.

An exemplary transaction described with reference to FIG. 5 may be illustrative. In this example, Node 2 in Quad 3 generates a request that maps (via map 501) to the local interconnection controller (i.e., Node 4). When the interconnection controller receives this request, its global map 505 maps the address to Quad 2. The interconnection controller then forwards the request to Quad 2. The interconnection controller at Quad 2 uses its local memory map to determine the proper node to target for the request—Node 1 in this example.

In a particular implementation, each processor or cluster node is limited to eight memory map registers. The scheme described above with reference to FIG. 5 requires four entries for the local memory space and at most two registers for remote space. Therefore, according to more specific embodiments, the two remaining entries can be used to subdivide regions. The eight mapping register limit requires that all memory local to a quad be allocated within a contiguous block. The interconnection controller's local memory map in such embodiments is also eight entries. However, the size of the interconnection controller's global map size is determined by the number of clusters in the system. According to various embodiments, the memory mapped I/O space is mapped by an identical set of mapping registers.

As described above, on the local cluster level, information from address mapping tables is used to identify the appropriate link on which to transmit information to a destination node within the cluster. To effect transmissions between clusters using the global mapping described above, a similar mechanism is needed. Therefore, according to various embodiments, in addition to the local routing tables associated with each node in a cluster, the interconnection controller maintains global routing information which maps the other clusters in the system to the various point-to-point transmission links interconnecting the clusters (e.g., links 111 of FIG. 1A).

According to a specific embodiment of the invention, two types of local routing tables are employed: one for directed packets and one for broadcast packets. Each table (e.g., tables 406 of FIG. 4) maintains a mapping between target nodes and links. For directed packets, a separate table is used for request and for responses. This allows responses to be routed back to the requester along the same path as the request. Maintaining the same route simplifies debugging and is not required for correctness. For broadcast packets, the corresponding table indicates on which links the broadcast packet is forwarded. A broadcast packet may thus be routed to multiple links.

In a particular implementation of the interconnection controller of the present invention, its local tables map a local destination node to one of four links for directed packets and any number of links for broadcast packets. The interconnection controller also maintains a global routing table that maps remote destination clusters to a particular remote link. According to a particular embodiment, the interconnection controller also supports multicast of packets at the global routing level.

Figures 6A, 6B:
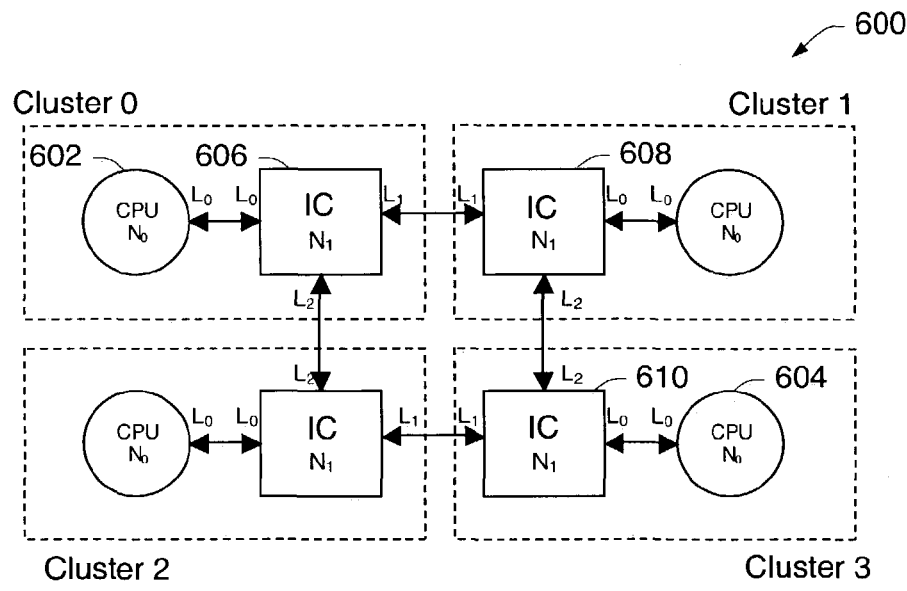
FIG. 6A is a simplified block diagram of a four cluster system for illustrating a specific embodiment of the invention.
FIG. 6B is a combined routing table including routing information for the four cluster system of FIG. 6A.

A specific embodiment of a routing mechanism designed according to the present invention will now be described with reference to FIGS. 6A and 6B. System 600 of FIG. 6A includes four clusters each having a plurality of local nodes including nodes $N_0$ and $N_1$. The table of FIG. 6B combines all of the local and global routing tables of the system for illustrative purposes.

As part of an exemplary transaction, a CPU 602 at node $N_0$ in Cluster 0 generates a packet directed to a CPU 604 at node $N_0$ in the Cluster 3. This packet could be, for example, a memory request that maps to a memory controller at that node. Because CPU 602 has no knowledge of anything outside of its cluster, it generates the packet targeting node $N_1$ in Cluster 0 (i.e., the local interconnection controller 606) as the destination. As discussed above, this is due to the fact that the local memory map owned by node $N_0$ (see the relevant portion of the table of FIG. 6B) identifies node $N_1$ as corresponding to all memory owned by remote clusters. Interconnection controller 606 receives the packet, uses its global address map (e.g., as described above) to determine that the final destination of the packet is Cluster 3, and generates a remote packet targeting Cluster 3. Then, using its global routing table (i.e., relevant portion of FIG. 6B), the interconnection controller 606 determines that this packet must be sent out on link $L_1$. Similar to the local routing mechanism described above, information identifying the source and destination cluster is appended to the packet.

When interconnection controller 608 at Cluster 1 receives the packet, it also determines that the packet is destined for Cluster 3 and determines from its global routing table (FIG. 6B) that link $L_2$ must be used to send the packet. Interconnection controller 610 at Cluster 3 receives the packet, determines that the packet is targeting the local cluster, and uses its local routing table (FIG. 6B) to determine that local link $L_0$ must be used to send the packet to its destination. CPU 604 at node $N_0$ then receives the packet via link $L_0$. According to specific embodiments in which the node ID space is a 3-bit ID space, this multi-level routing mechanism can be extended to eight local nodes with no specific limit on the number of clusters.

Having a multi-level routing mechanism allows a system to have a relatively unbounded number of processors and processing clusters. However, with the increase the system size and complexity, it becomes increasingly critical to provide mechanisms for dynamically adding and removing processors and processing clusters without disrupting system performance. More configurations are also possible with a large number of processors and processing clusters, and it becomes beneficial to allow configuration changes in a seamless manner. One type of configuration change is the removal or dynamic replacement of defective components such as processors, processing clusters, links, etc.

Conventional mechanisms for opening and closing links are limited. Existing mechanisms lack provisions for dynamically opening a link that was not found during reset or closing a link that was found during reset, for example. Consequently, it is desirable to provide improvements that allow a user to dynamically enable or disable links and change the configuration of a multiple processor, multiple cluster system. In one example, a user could dynamically add resources such as processors and processing clusters to an existing system. In another example, a user could dynamically replace faulty components like interconnection controllers or HyperTransport cables between clusters.

According to various embodiments of the present invention, mechanisms are provided in interconnection controllers to allow the dynamic enabling and disabling or links. In one embodiment, configuration space registers are associated with an interconnection controller. The configuration space registers include information for enabling physical layer and link layer communications, indicators for reinitializing a link, and identifiers for tracking processing clusters coupled to the interconnection controllers.

Figure 7:
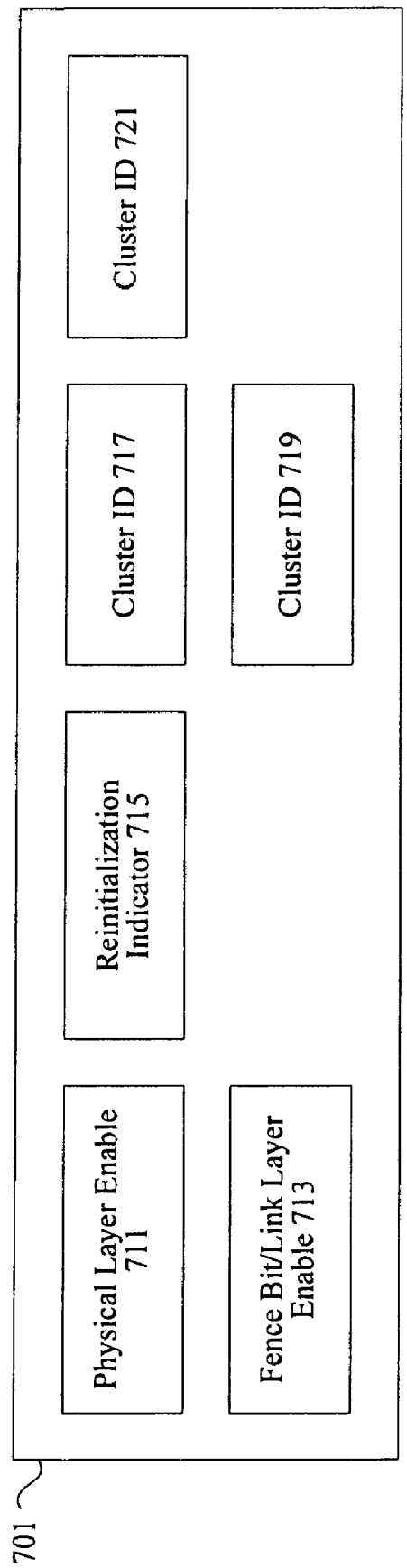
FIG. 7 is a diagrammatic representation showing configuration space registers associated with an interconnection controller.

FIG. 7 is a diagrammatic representation showing configuration space registers. Configuration space registers 701 are provided to enable and disable physical and link layer communications between processors and clusters. Configuration space registers 701 may be included in an interconnection controller to manage intercluster communications. It should be noted that configuration space registers 701 may also be included in other resources. Mechanisms maintaining multiple processor cluster IDs as well as physical layer and link layer toggle indicators are referred to herein as configuration space registers. In one example, configuration space registers 701 include a physical layer indicator 711 to enable or disable physical layer communications. Disabling physical layer communications by writing to a configuration space registers shuts down links between processors and clusters. In one example, physical macros will be turned off and there will be no electrical activity originating from the disabled physical macro. No polling will be done, and the associated interconnection controller will not respond to any polling or maintain any links. According to various embodiments, configuration space registers 701 also include a link layer indicator 713. In one example, the link layer indicator 713 is a fence bit. Disabling the link layer by writing to the configuration space registers prevents a link from being used for any communications other than physical layer communications.

However, the interconnection controller will still respond to polling and will maintain existing connection. Because nothing other than physical layer communications are allowed, no HyperTransport command or data packets can be sent across a link with a disabled link layer. Polling state can be maintained using configuration space registers. In one example, if a link is not found when a system is coming out of reset, the physical layer protocol has the capability to continuously poll a link to determine if any device has been attached. This polling feature can be enabled or disable by setting appropriate toggles in the configuration space registers. Polling allows hot plugging of resources to an existing cluster with automatic recognition and notification. In one example, polling allows the hot plugging of a new multiple processing cluster to an existing multiple processing cluster.

The processor maintaining a system configuration could choose to enable the link when a new cluster is attached and expand the system or simply inform a user that a connection recently made has been recognized by the system. According to various embodiments, the configuration space registers also include a reinitialize indicator 715 to indicate whether or a new initialization sequence should be performed. Registers for holding cluster identifiers 717, 719, and 721 also are provided to allow configuration space registers 701 to maintain the IDs of connected clusters. It should be noted that not all of the values in the configuration space registers 701 are necessary. For example, in a system that supports only two clusters, only a single register may be provided for holding a cluster ID. In the same manner, configuration space registers 701 may hold other information, such as specific polling state information.

Figure 8:
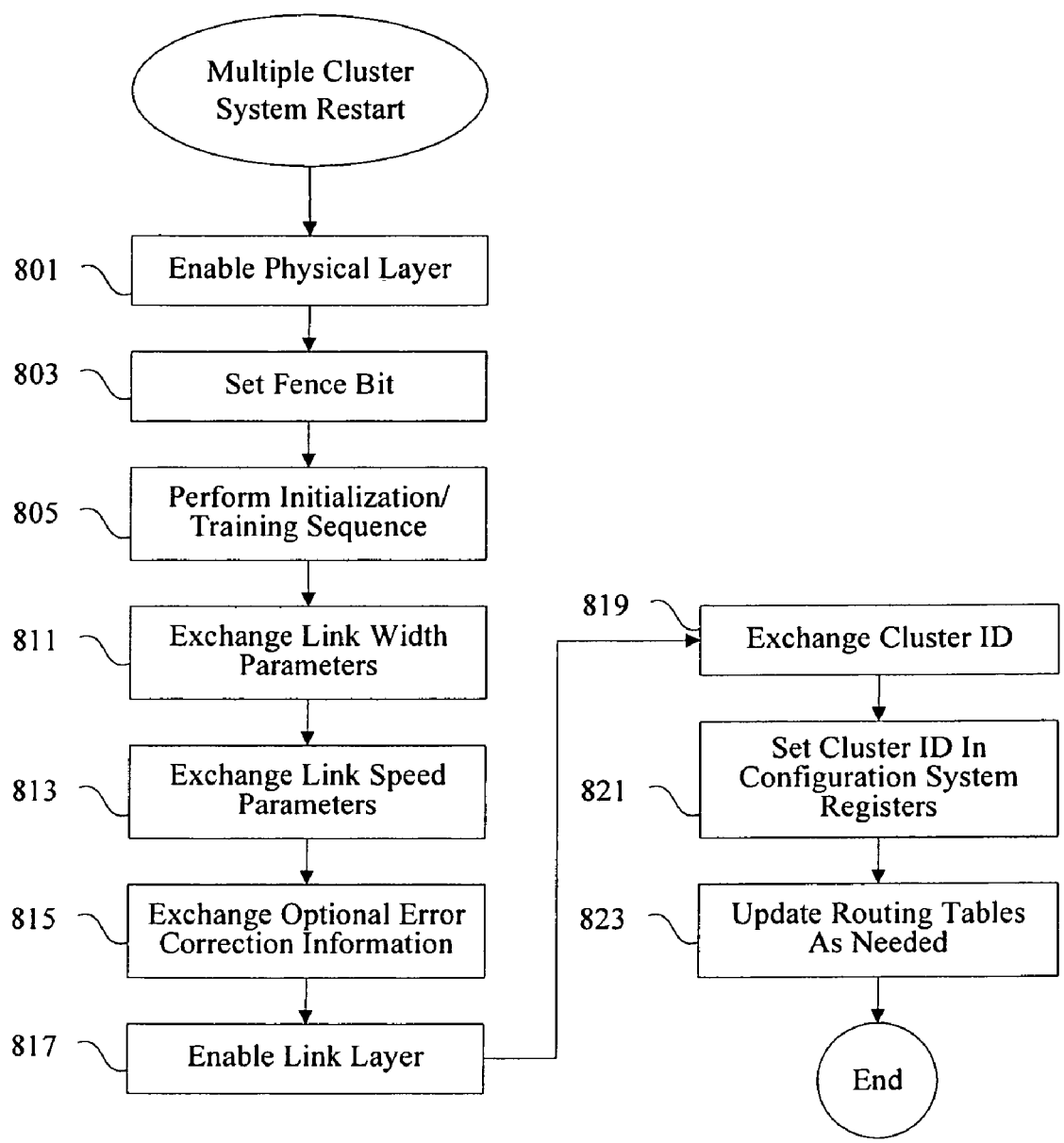
FIG. 8 is a flow process diagram showing restart of a system.

FIG. 8 is a flow process diagram showing one technique for using configuration space registers during reset of the system. At 801, physical layer communications are enabled out of reset. Standard physical layer initialization sequences can be performed upon enabling the physical layer. The polling state may also be maintained. In one example, the polling state is set to active and the interconnection controller not only monitors the link for presence of other resources but also actively sends out sequences of bits. In another example, the polling state is set to passive and the interconnection controller merely monitors for the presence of other resources. At 803, a fence bit is set to disable link layer communications. Disabling link layer communications allows physical layer communications to be established without interference from data local transmissions. It should be noted, however, that link layer communications do not necessarily have to be disabled. At 805, the initialization sequence or a training sequence is transmitted.

Transmission is typically performed using serialization and deserialization (SERDES) mechanisms and 8*b*/10*b* encoding. 8*b*/10*b* encoding replaces continuous sequences of ones or zeros with mixed sequences and is used for several reasons. 8*b*/10*b* helps to generate enough signal transitions in the transmitted data to ensure correct PLL operation. Without this 8B/10B encoding scheme, a string of ones or zeros in the data could cause the receive clock to drift or lose synchronization, causing loss of data. 8*b*/10*b* also ensures that the signal is DC balanced, which means that no DC offset develops in the link over time. 8B/10B encoded characters follow specific rules that detect many signaling errors immediately.

Examples of initialization or training sequences that can be used are described in the Infiniband Architecture Specification Volumes I and II available from the Infiniband Trade Association, the entireties of which are incorporated by reference for all purposes. It should be noted that Infiniband does not necessarily have to be used. During the initialization of physical layer communications, information is exchanged between interconnection controllers. At 811 link width parameters are exchanged. At 813, link speed parameters are exchanged. At 815, optional error correction information is exchanged. At 817, the link layer is then enabled by toggling the fence bit off. With the link layer enabled, data communications can proceed. At 819, cluster ID information is exchanged. At 821, the cluster ID is set in the configuration space registers. At 823, routing tables associated with the interconnection controllers are updated as needed to reflect connected resources.

In another example, there is no assumption made on synchronization of reset across multiple clusters. Any chronological order of assertion and deassertion of system reset signals is valid. In one instance, each remote link layer in each cluster comes up with the fence bit cleared after the deassertion of reset. Each remote link comes up disabled and the remote physical layer is polling for the presence of another cluster on the other end of the connection. After the clusters on both ends of a remote connection are out of reset, the remote physical layers detect each other upon polling. According to various embodiments, the remote physical layers can now perform an initialization/training sequence which might involve exchanging link width parameters, link speed parameters, error correction information, as well as any other information needed for a reliable establishment of the physical link connection.

After the initialization/training sequence, the cluster ID field can be exchanged. Since the clusters just came out of reset, the cluster ID is can be initialized to predetermined fixed value, e.g. all zeros. The remote cluster ID are then maintained in the CSR. The physical layer is enabled while the link layer is still disabled. At this point, the service processor does an exploration of the whole system starting from the primary cluster by reading the CSRs of the remote links in the primary cluster, assigning cluster Ids, and writing a CSR to reinitialize the physical layers of the remote connections.

According to various embodiment, the service processor in the primary cluster now gets the information about which cluster is connected to which other clusters through remote links on each cluster. The information is used to generate the routing tables. The information is also passed to the BIOS. The BIOS sets the "initialize link layer" bit in a CSR in one of clusters. This causes the link layer on one side to start the link layer initialization with a link layer start packet. When the link layer on the other side receives the link layer start packet, it replies with a link layer start packet and the link layer is established.

When the link layer is up, packets can be sent across remote links from the primary cluster to program/initialize the processors and controllers in the remote clusters. The system is now running. In one instance, if any remote connection is not used, the service processor or BIOS can choose to fence of the link layer and disable the physical layer for those remote connections.

Figure 9:
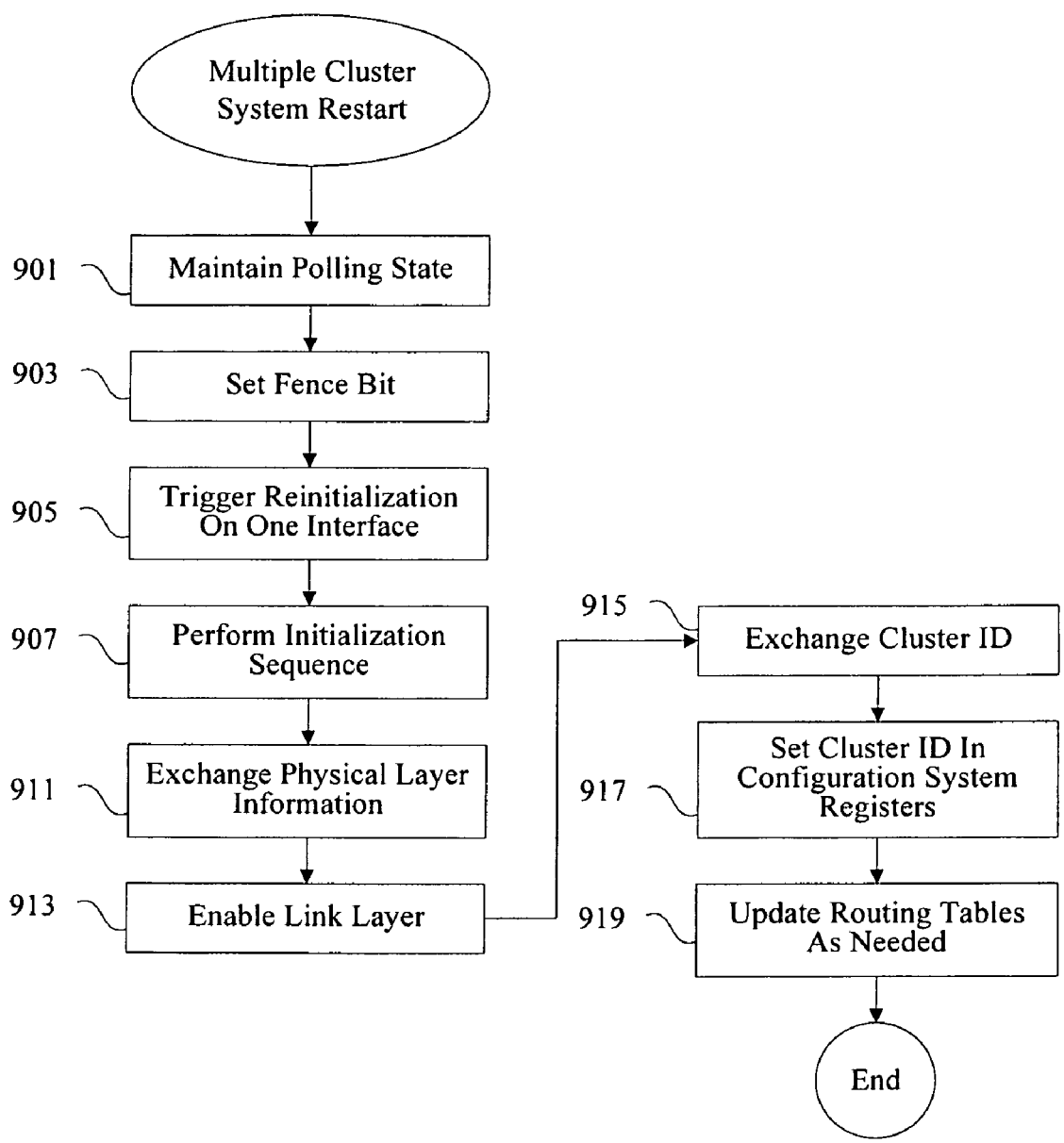
FIG. 9 is a flow process diagram showing the dynamic introduction of a new link.

FIG. 9 is a flow process diagram showing use of space registers during hot plugging. Any dynamic attachment of resources to a system while a system is still running is referred to herein as hot plugging. At 901, the polling state is maintained at an interconnection controller. At 903, a fence bit is maintained to disable the link layer. It should be noted, however, that a fence bit does not necessarily have to be disabled. When a new processing cluster is detected, a reinitialization is triggered at 905. In one example, reinitialization is triggered by writing a bit to be reinitialization indicator of the configuration space registers. At 907, initialization sequences or training sequences are sent. At 911, information such as link width and links speed is exchanged. The link layer is then enabled at 913. At 915, the cluster ID of the newly added group of processors is written to the configuration space registers. At 917, routing tables described above are similarly updated to allow multiple cluster communications.

In another example, one or more clusters are running and a new cluster needs to be added to the system. According to various embodiments, reset is asserted and deasserted on the new cluster that needs to be added. If the physical layer for a remote connection to the new cluster is disabled, the physical layer placed into the polling state. The remote connection is unfenced. Cluster IDs are exchanged and the physical layer is enabled. The service processor generates information needed to program the new cluster and also the main cluster in a similar manner as noted above. The link layer of the new remote connection is now initialized.

Figure 10:
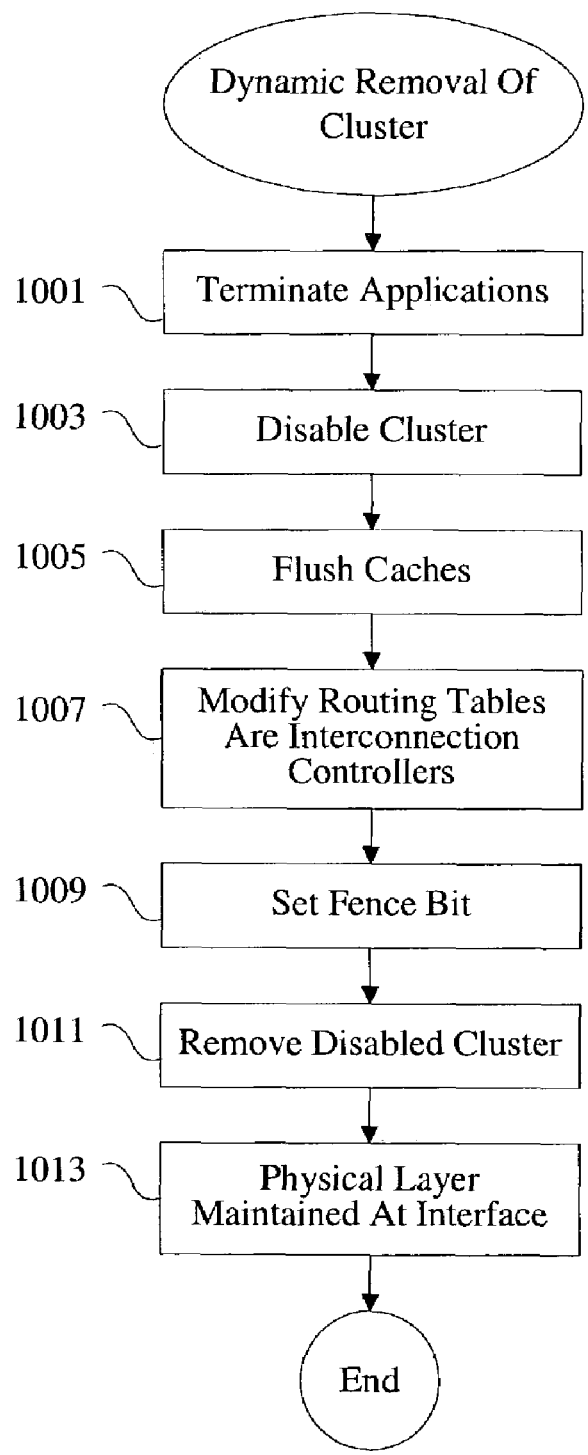
FIG. 10 is a flow process diagram showing the dynamic removal of an existing link.

FIG. 10 is a flow process diagram showing a technique for dynamically removing resources from a system. It is typically difficult to dynamically unplug resources such as processors or processing clusters while a system is active because removing processors and their associated caches critically affects system operation. In one example, data being processed by a particular application may be held in an intermediate state in processor caches to be removed from a system. Similarly, an operating system processes may be running on one or more processors set for removal. According to various embodiments, an operating system supporting dynamic removal of clusters would be used. In one example, applications are terminated at 1001 in an operating system environment that supports dynamic removal of multiprocessor clusters. A cluster is disabled at 1003 but not yet unplugged. At 1005, caches associated with the cluster to be removed are flushed. At 1007, routing tables are modified to reflect the removal of a processing cluster. At 1009, a fence bit is written in the configuration space registers. A fence bit may be written by a variety of entities. In one example, the fence bit is written by a service processor or by a JTAG interface associated with a processor. At 1011, the multiple processor cluster can be physical removed. At 1013, the physical layer at the interconnection controller still residing in the system may be maintained in order to allow for a new or replacement cluster of processors to be introduced.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single interconnection controller, or multiple interconnection controllers can be used in a single cluster. Therefore, the scope of the invention should be determined with reference to the appended claims.

What is claimed is:

1. A method comprising:

terminating a plurality of applications running in an operating system environment that supports dynamic removal of a first processor cluster from a plurality of processor clusters, the first processor cluster including a first plurality of processors and a first interconnection controller interconnected using a point-to-point architecture;

identifying the first processor cluster for removal;

flushing a plurality of caches associated with the first processor cluster;

modifying a plurality of routing tables associated with each processor cluster to reflect removal of the first processor cluster;

disabling link layer communications associated with the first processor cluster, wherein the first processor cluster is disconnected after disabling link layer communications associated with the first processor cluster;

maintaining physical layer communications associated with the first processor cluster to allow connection of a replacement processor cluster.

2. The method of claim 1, wherein a fence bit is written by a service processor.

3. The method of claim 1, wherein a fence bit is written by a JTAG interface associated with a processor.

4. The method of claim 1, wherein the first cluster of processors and a second cluster of processors share a single virtual address space.

5. The method of claim 4, wherein the second cluster of processors includes a second interconnection controller.

6. The method of claim 5, wherein the second interconnection controller includes a physical layer enable indicator.

7. The method of claim 5, wherein the second interconnection controller includes a fence indicator configurable to prevent the transmission of logical packets between the first interconnection controller and the second interconnection controller.

8. The method of claim 5, wherein the second interconnection controller includes a reinitialization indicator configurable to direct the second interconnection controller to reinitialize the link.

9. An apparatus comprising:

means for terminating a plurality of applications running in an operating system environment that supports dynamic removal of a first processor cluster from a plurality of processor clusters, the first processor cluster including a first plurality of processors and a first interconnection controller interconnected using a point-to-point architecture;

means for identifying a first processor cluster for removal;

means for flushing a plurality of caches associated with the first processor cluster;

means for modifying a plurality of routing tables associated with each processor cluster to reflect removal of the first processor cluster;

means for disabling link layer communications associated with the first processor cluster, wherein the first processor cluster is disconnected after disabling link layer communications associated with the first processor cluster;

means for maintaining physical layer communications associated with the first processor cluster to allow connection of a replacement processor cluster.

10. The apparatus of claim 9, wherein a fence bit is written by a service processor.

11. The apparatus of claim 9, wherein a fence bit is written by a JTAG interface associated with a processor.

12. The apparatus of claim 9, wherein the first cluster of processors and the second cluster of processors share a single virtual address space.

* * * * *